United States Patent
Shyu

(12) 
(10) Patent No.: US 6,456,412 B1
(45) Date of Patent: Sep. 24, 2002

(54) MULTIPLE REFLECTION OPTICAL SYSTEM FOR SCANNERS

(75) Inventor: Devon Shyu, Tainan (TW)

(73) Assignee: Avision Inc., Hsin-Chu (TW)

( * ) Notice: Subject to any disclaimer, the term of this patent is extended or adjusted under 35 U.S.C. 154(b) by 0 days.

(21) Appl. No.: 09/736,459

(22) Filed: Dec. 15, 2000

(51) Int. Cl.[7] .............................. G02B 26/08
(52) U.S. Cl. ............ 359/196; 359/223; 358/474; 358/494; 358/496; 358/497
(58) Field of Search ................. 359/196–226; 358/474, 487, 494, 496, 497

(56) References Cited

U.S. PATENT DOCUMENTS 5,907,411 A * 5/1999 Han ........................... 358/847
6,144,475 A * 11/2000 Sheng ........................ 359/196
6,172,784 B1 * 1/2001 Konda ........................ 359/196

* cited by examiner

Primary Examiner—James Phan
(74) Attorney, Agent, or Firm—H. C. Lin Patent Agent

(57) ABSTRACT

The optical system of a scanner comprising at least four reflecting mirrors, a focusing lens and an image sensor has its lens placed outside the area encircled by the reflecting mirrors so that the reflecting mirrors can be placed closer in the vertical direction. Thus, the vertical dimension of the scanner is made smaller.

6 Claims, 6 Drawing Sheets

MULTIPLE REFLECTION OPTICAL SYSTEM FOR SCANNERS

BACKGROUND OF THE INVENTION (1) Field of the Invention

This invention relates to scanners, in particular to multiple reflection optical system of the scanners.

(2) Brief Description of Related Art

An optical system of prior art is shown in FIG. 1. The scanner has a scan window 10, over which a document 12 to be scanned is placed. A light source L scans the document 12 and a light ray containing the image information of the document is reflected. In the multiple reflected path optical system, the reflected light ray undergoes multiple reflections in sequence: reflected by a mirror 161 at point A, reflected by a mirror 162 at point C, reflected by a mirror 165, reflected by a mirror 164, reflected again by the mirror 161 at point B, reflected again by the mirror 162 at point D, reflected finally by the mirror 165 before reaching the image sensor 18 through the focusing lens 14. In this optical system, the focusing lens 14 is enclosed by all the reflecting mirrors. The reflecting mirrors 161 and 162 must be separated vertically from the reflecting mirrors 163 and 164 by a certain distance to allow the placement of the focusing lens 14. This vertical distance determines the vertical dimension of the scanner frame.

SUMMARY OF THE INVENTION

An object of this invention is to reduce the vertical dimension of a scanner. Another object is to reduce the cost of a scanner.

These objects are achieved by placing the focusing lens outside the area surrounded by the reflecting mirrors, so that no vertical space between the reflecting mirrors need be allowed for the focusing lens.

DETAILED DESCRIPTION OF THE INVENTION

Figure 1:
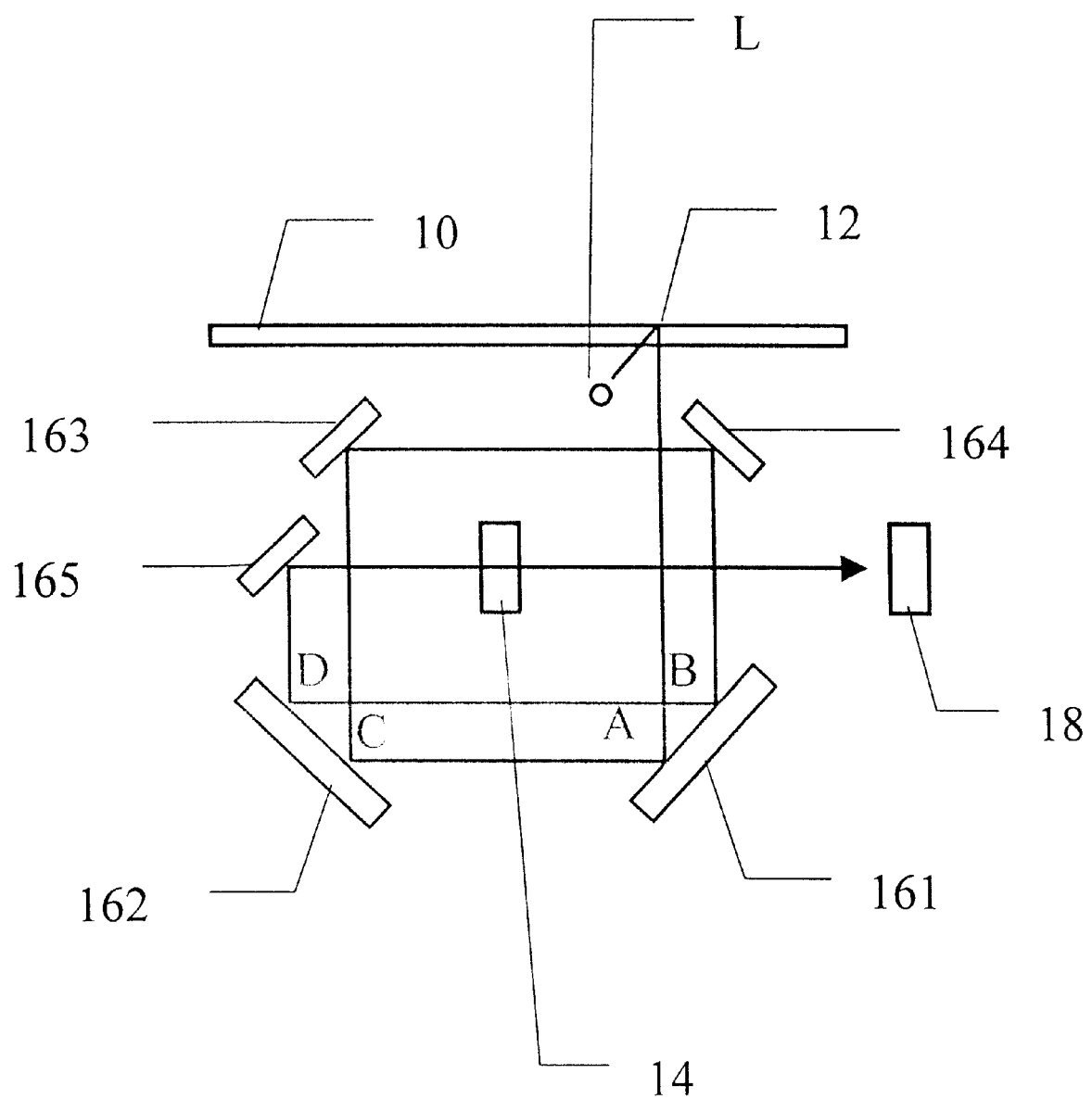
FIG. 1 shows a prior art optical system
Figure 2:
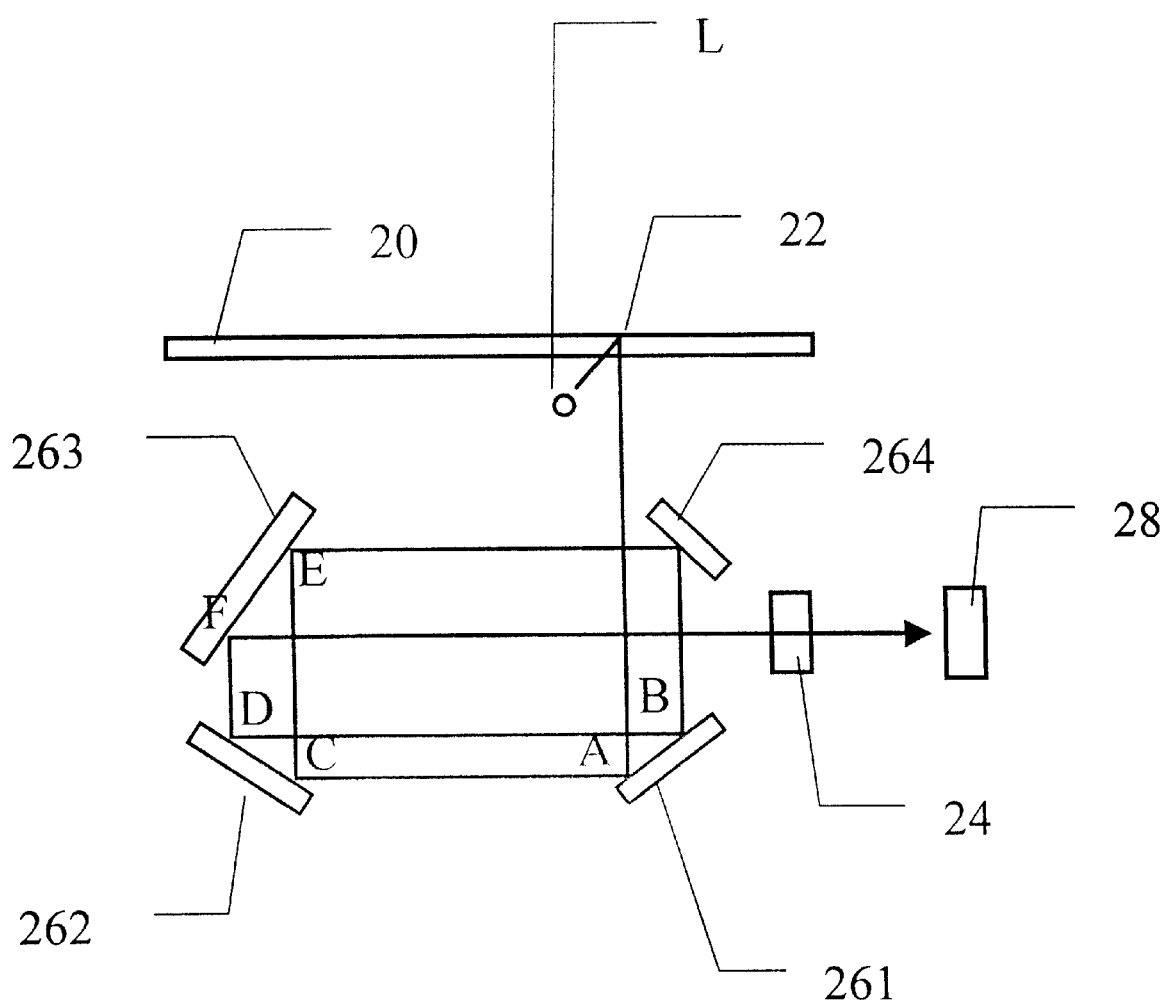
FIG. 2 shows a first embodiment of the optical system of the present invention.

FIG. 2 shows the first embodiment of the present invention. A document 22 is placed over a scan window 20 of a scanner. A light source L scans the document 22 and a light ray with image signal is reflected. The light ray is reflected in sequence by a number of mirrors: by a mirror 261 at point A, by a mirror 262 at point C, by a mirror 263 at point E, by a mirror 264, by the mirror 261 again at point B, by the mirror 262 again at point D, and by the mirror 263 again at point F. The optical system has a tetragon light path. The last reflection directs the light ray to the image sensor 28 through a focusing lens 24, which is placed to the right of the mirrors. Since the lens 24 is placed outside the space enclosed by the mirrors and no space need be allowed for its placement, the vertical distance between the mirrors 261, 262 and mirrors 263, 264 can be made small.

Figure 3:
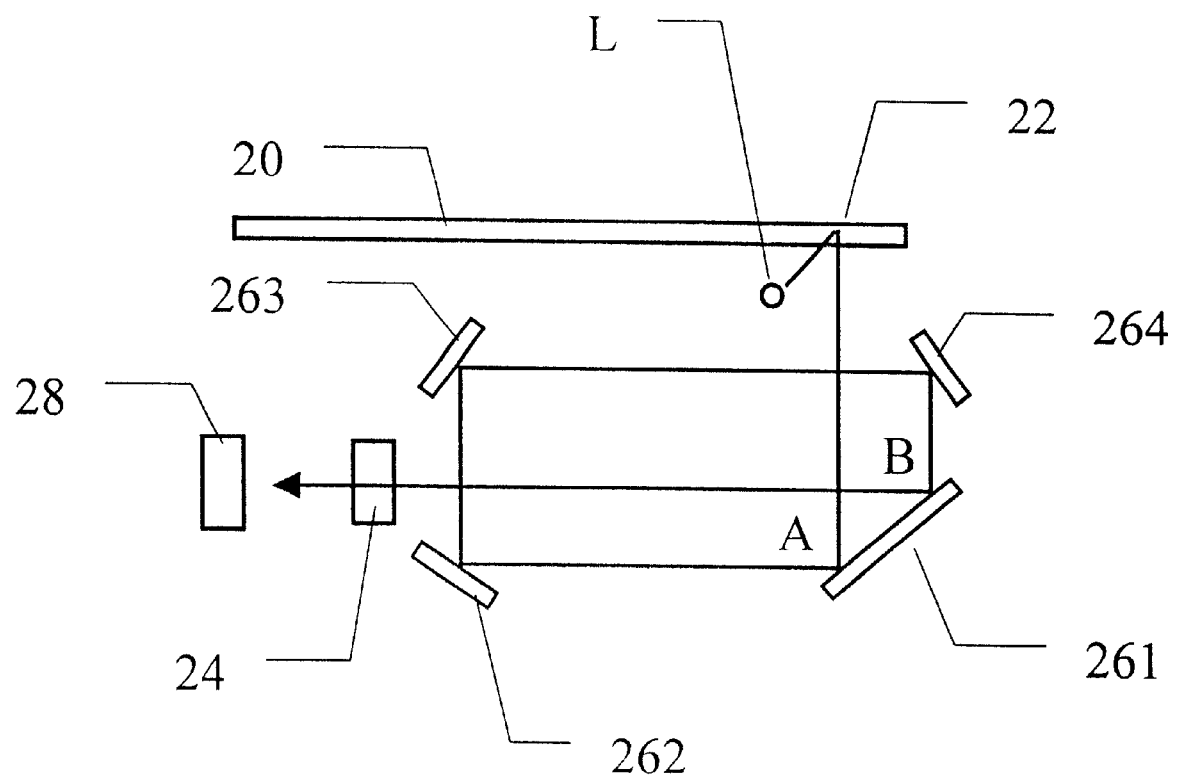
FIG. 3 shows a second embodiment of the present invention.

FIG. 3 shows another embodiment of the present invention. As in FIG. 2, a document 22 is placed over a scan window 20 of a scanner. A light source L scans the document 22 and reflects a light ray with image signal. The light ray is reflected in sequence by a number of mirrors: by mirror 261 at point A, by mirror 262, by mirror 263, by mirror 264, and by mirror 261 again at point B. The optical system also has a tetragon light path. The last reflection directs the light ray to the image sensor 28 through a focusing lens 24, which is placed to the left of the mirrors. Since the lens 24 is placed outside the space enclosed by the mirrors and no space need be allowed for its placement, the vertical distance between the mirrors 261, 262 and mirrors 263, 264 can be made smaller than prior art.

Figure 4:
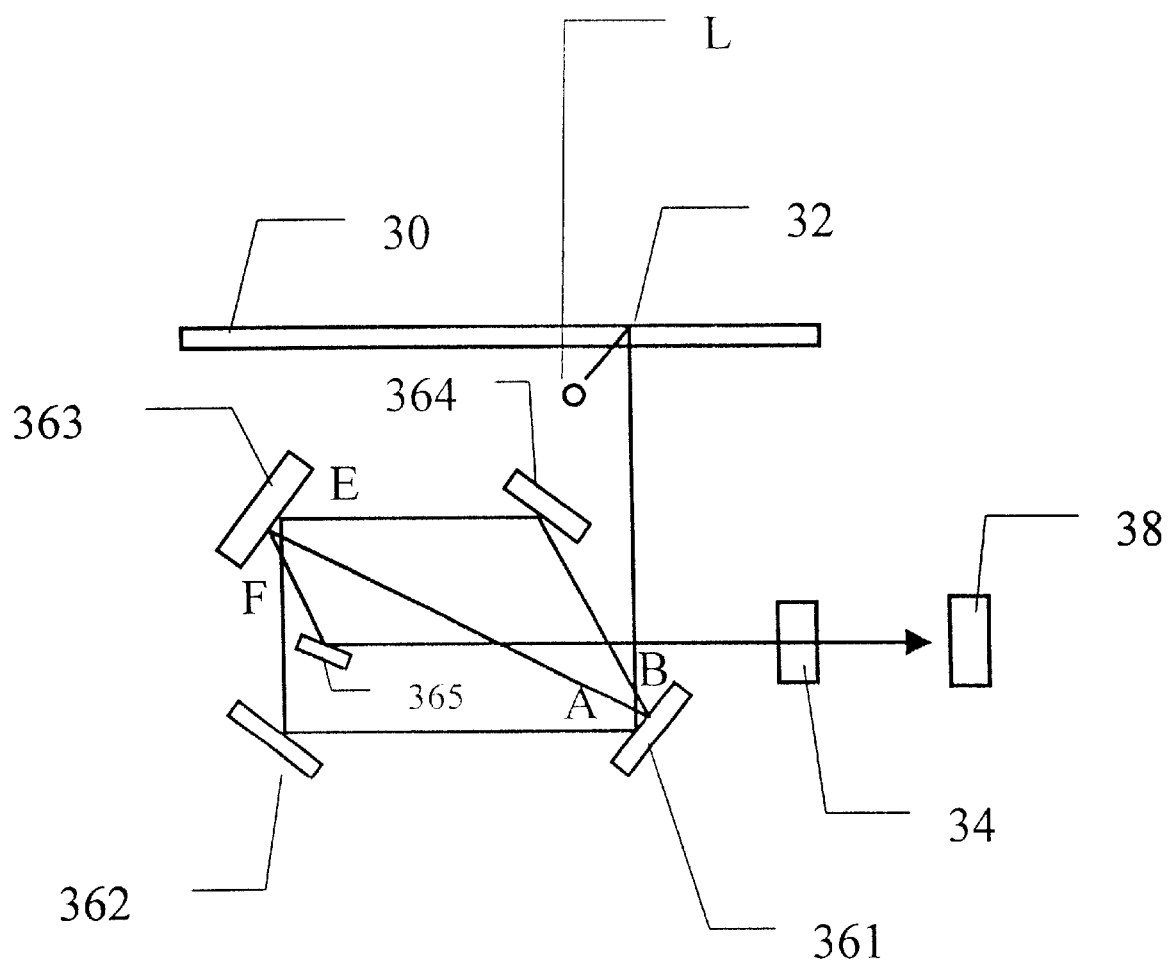
FIG. 4 shows a third embodiment of the present invention.

FIG. 4 shows a third embodiment of the present invention. The system is similar to that in FIG. 2 except that an additional reflecting mirror 365 is used as the last reflecting mirror. As in FIG. 2, a document 32 is placed over a scan window 30 of a scanner. A light source L scans the document 32 and a light ray with image signal is reflected. The light ray is reflected in sequence by a number of mirrors: by mirror 361 at point A, by mirror 362, by mirror 363 at point E, by mirror 364, by mirror 361 again at point B, by mirror 363 again at point F, and by mirror 365. The last reflection directs the light ray to the image sensor 28 through a focusing lens 34, which is placed to the right of the mirrors, i.e. the light emitting from the last mirror 365 is opposite to the direction of the first reflection of mirror 361. Since the lens 34 is placed outside the mirrors and no space need be allowed for its placement, the vertical distance between the mirrors 361, 362 and mirrors 363, 364 can be made smaller than prior art.

Figure 5:
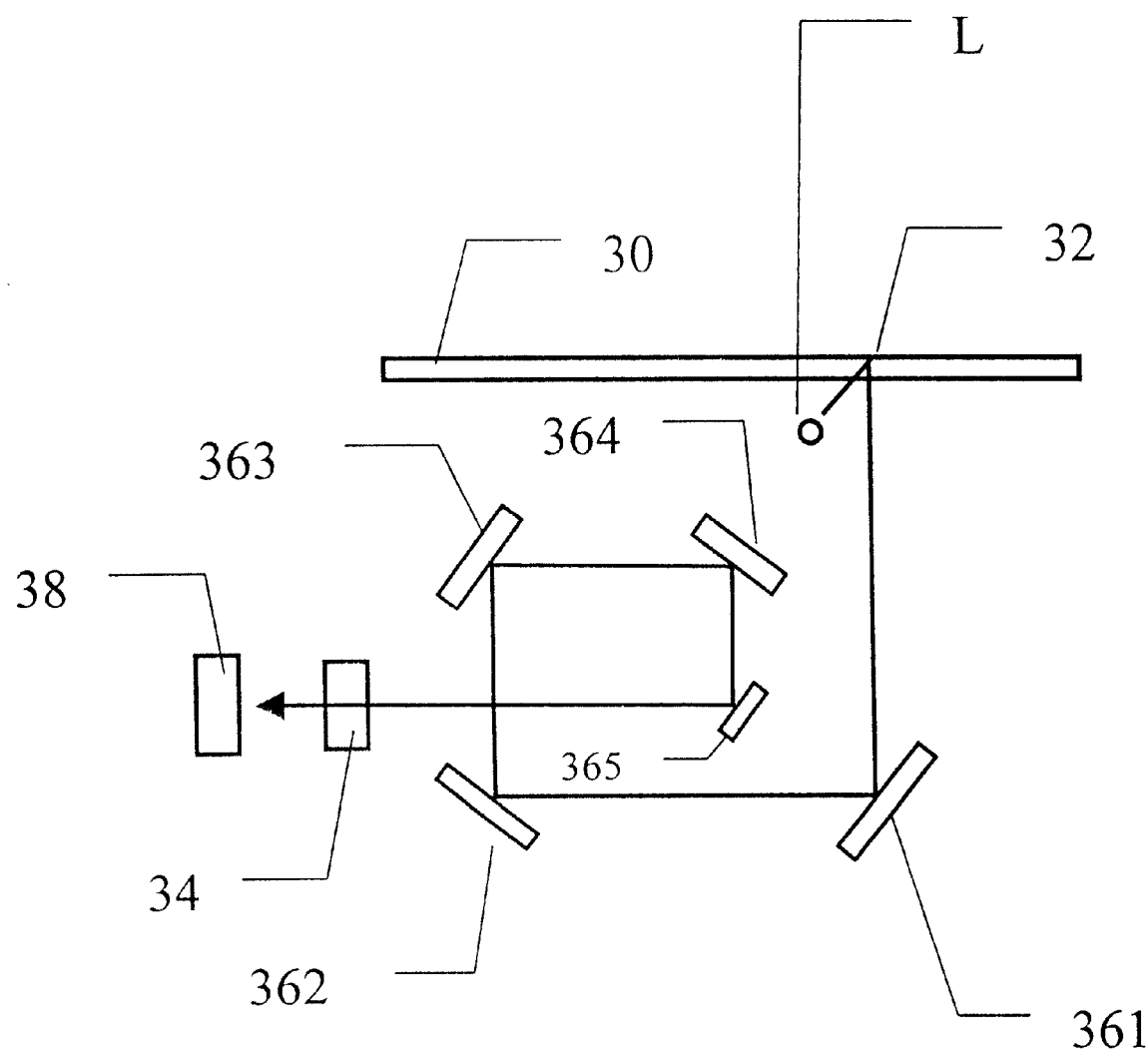
FIG. 5 shows a fourth embodiment of the present invention.

FIG. 5 shows a fourth embodiment of the present invention. The system is similar to that in FIG. 3 except that an additional reflecting mirror 365 is used as the last reflecting mirror. As in FIG. 3, a document 32 is placed over a scan window 30 of a scanner. A light source L scans the document 32 and a light ray with image signal is reflected. The light ray is reflected in sequence by a number of mirrors: by mirror 361, by mirror 362, by mirror 363, by mirror 364, and by mirror 365. The least reflection directs the light ray to the image sensor 38 through a focusing lens 34, which is placed to the left of the mirrors, i.e. the light emitted from the last mirror 363 is in the same direction as the first reflection of mirror 361. Since the lens is placed outside the mirrors and no space need be allowed for its placement, the vertical distance between the mirrors 361, 362 and mirrors 363, 364 can be made smaller than that of the prior art.

Figure 6:
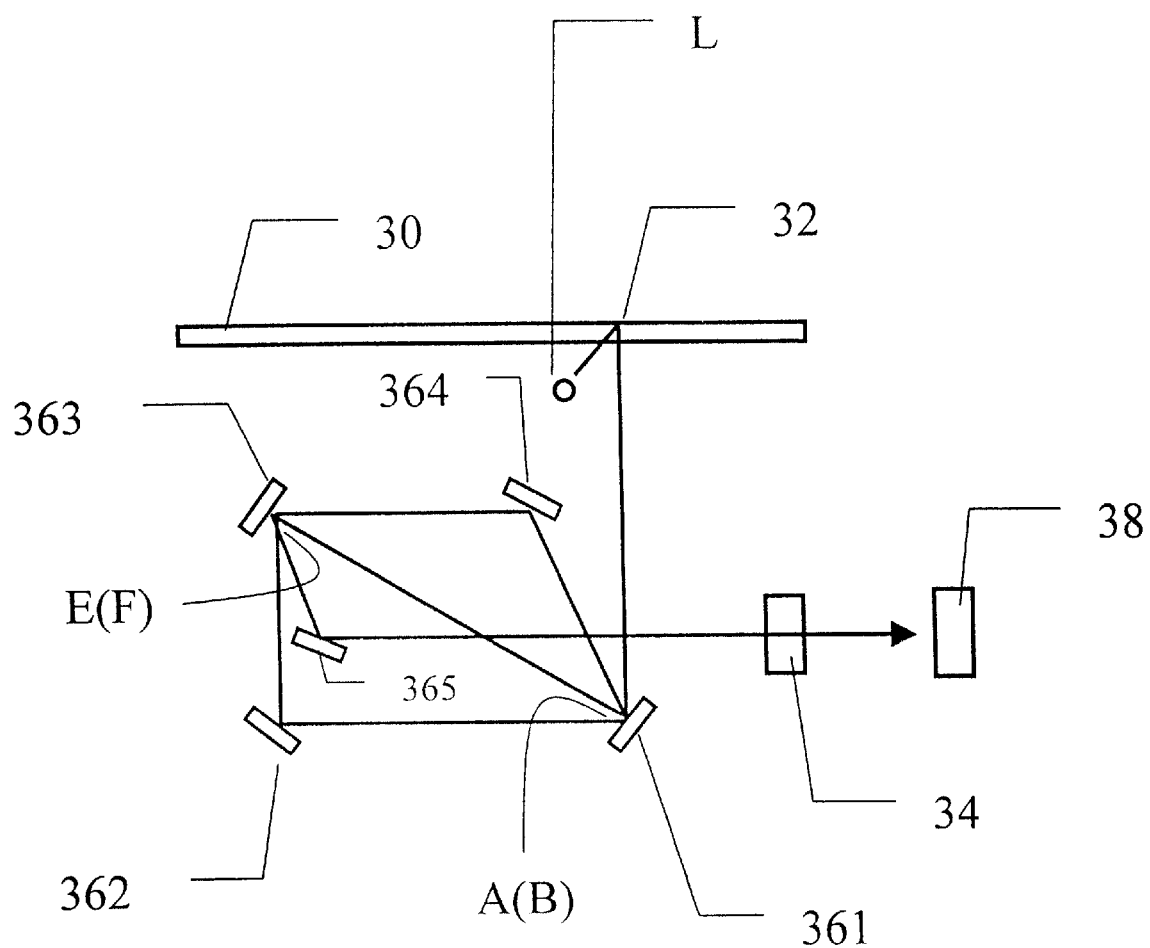
FIG. 6 shows a fifth embodiment of the present invention.

FIG. 6 shows a fifth embodiment of the present invention. The system is similar to that in FIG. 4, except that the reflection points A and B of mirror 361 are merged, and the reflection points E and F of mirror 363 are merged. Whether the reflection points A and B or reflection points E and F are merged or not, the operation is not affected. The same advantage of FIG. 4 over prior art holds true. In this case, since each of all the mirrors has only one reflection point, the mirrors can be made shorter or smaller so that the scanner can thus be made smaller.

While the preferred embodiments of the invention have been described, it will be apparent to those skilled in the art that various modifications may be made in the embodiments without departing from the spirit of the present invention. Such modifications are all within the scope of this invention.

What is claimed is:

1. An optical system for scanner having a scan window and scanning light source for scanning a document placed over said scan window, comprising:

at least four reflecting mirrors including first to fourth reflecting mirrors arranged in sequence for reflecting in alternate horizontal and vertical sequence the optical signal reflected by said document; and a lens located outside the horizontal boundaries enclosing said reflecting mirrors for focusing the optical signal reflected by said at least four reflecting mirrors so as to save the vertical space between said reflecting mirrors.

2. The optical system as described in claim 1, further comprising:

an image sensor located behind said lens for receiving the optical signal outputted from said lens.

3. The optical system as described in claim 1, wherein there are four said reflecting mirrors, namely a first mirror, a second mirror, a third mirror and a fourth mirror.

4. The optical system as described in claim 3, wherein said light ray is reflected twice by the first mirror of said reflecting mirrors, twice by the second mirror of said reflecting mirrors, twice by the third mirror of said reflecting mirrors, and once by the fourth reflecting mirror of said reflecting mirrors.

5. The optical system as described in claim 3, wherein said light ray is reflect once by the first mirror of said reflecting mirrors, once by the second mirror of said reflecting mirrors, once by the third mirror of said reflecting mirrors, and once by the fourth mirror of said reflecting mirrors.

6. The optical system as described in claim 4, further comprising a fifth reflecting mirror inserted between said fourth reflecting mirror and said lens.

* * * * *